US011215480B2

(12) United States Patent
Hashimoto et al.

(10) Patent No.: US 11,215,480 B2
(45) Date of Patent: Jan. 4, 2022

(54) ROTATION SPEED DETECTING APPARATUS OF INTERNAL COMBUSTION ENGINE

(71) Applicant: HONDA MOTOR CO., LTD., Tokyo (JP)

(72) Inventors: Shota Hashimoto, Wako (JP); Hidemichi Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 16/548,297

(22) Filed: Aug. 22, 2019

(65) Prior Publication Data
US 2020/0103253 A1 Apr. 2, 2020

(30) Foreign Application Priority Data

Sep. 28, 2018 (JP) .............................. JP2018-183837

(51) Int. Cl.
*G01M 15/04* (2006.01)
*G01D 5/245* (2006.01)
(Continued)

(52) U.S. Cl.
CPC .......... *G01D 5/245* (2013.01); *F02D 41/009* (2013.01); *F02F 7/0043* (2013.01); (Continued)

(58) Field of Classification Search
CPC .......... F16C 3/06; G01L 3/109; F02D 41/009; F02D 2200/101; G01D 5/245; G01M 15/046; G01M 15/11
See application file for complete search history.

(56) References Cited

U.S. PATENT DOCUMENTS 5,139,003 A * 8/1992 Ohhashi .................. F02P 7/026
   123/635
5,353,758 A * 10/1994 Masuda ................ F02B 61/045
   123/143 C
(Continued)

FOREIGN PATENT DOCUMENTS

CN   100564850 C   12/2009
CN   101331305 B   10/2010
(Continued)

OTHER PUBLICATIONS

JP 2009145299 A Description—Publication: Jul. 2, 2009.*
(Continued)

*Primary Examiner* — George C Jin
*Assistant Examiner* — Teuta B Holbrook
(74) *Attorney, Agent, or Firm* — Rankin, Hill & Clark LLP

(57) ABSTRACT

In a rotation speed detecting apparatus of an internal combustion engine having a rotor supported by an end part of the crankshaft, a pulser ring that has a detected body composed of recess-projection teeth and rotates integrally with the rotor, and a detector that detects the rotation speed of the crankshaft by detecting the detected body, the detected body has a detected surface opposed to the detector, and the detected surface is inclined in such a manner as to be located closer to the outside of the crankshaft in the axial direction of the crankshaft as getting more apart from an axis line of the crankshaft in the radial direction. In the detector, an axis line of the detector is inclined with respect to the axis line of the crankshaft in such a manner that the detector is opposed to the detected surface.

5 Claims, 5 Drawing Sheets

(51) Int. Cl.
*F02D 41/00* (2006.01)
*F02F 7/00* (2006.01)
*G01M 15/11* (2006.01)
*F16C 3/06* (2006.01)

(52) U.S. Cl.
CPC .......... *G01M 15/046* (2013.01); *G01M 15/11* (2013.01); *F02D 2200/101* (2013.01); *F16C 3/06* (2013.01)

(56) References Cited

U.S. PATENT DOCUMENTS

| | | | | | |
|---|---|---|---|---|---|
| 5,651,352 | A | * | 7/1997 | Terakado | F02P 7/026 123/613 |
| 6,133,729 | A | * | 10/2000 | Mierzwinski | G01P 1/00 324/174 |
| 6,386,166 | B1 | * | 5/2002 | Scott | F01L 1/34 123/90.17 |
| 2003/0136359 | A1 | * | 7/2003 | Brosch | F04B 23/106 123/56.1 |
| 2004/0154566 | A1 | * | 8/2004 | Naito | F01L 1/022 123/90.15 |
| 2007/0200439 | A1 | * | 8/2007 | Nagahashi | F01M 1/08 310/54 |
| 2007/0257668 | A1 | * | 11/2007 | Nakagawa | G01P 3/487 324/207.22 |
| 2009/0105042 | A1 | * | 4/2009 | Tanba | B60W 10/02 |
| 2014/0007664 | A1 | * | 1/2014 | Ito | F02D 41/22 73/114.02 |
| 2016/0123194 | A1 | * | 5/2016 | Kajiura | F01L 1/352 123/90.15 |
| 2016/0178480 | A1 | * | 6/2016 | Turner | G01D 5/2457 73/114.26 |
| 2018/0283317 | A1 | * | 10/2018 | Shigematsu | F02F 7/0043 |

FOREIGN PATENT DOCUMENTS

| | | |
|---|---|---|
| CN | 103210196 B | 2/2017 |
| JP | H04-203226 | 7/1992 |
| JP | 2009-145299 A | 7/2009 |
| JP | 2009145299 A * | 7/2009 |
| JP | 4552687 B2 | 9/2010 |

OTHER PUBLICATIONS

Japanese Office Action with English translation dated Apr. 7, 2020, 7 pages.
Indian Office Action with English text, dated Jun. 17, 2020, 6 pages.

* cited by examiner

ROTATION SPEED DETECTING APPARATUS OF INTERNAL COMBUSTION ENGINE

INCORPORATION BY REFERENCE

The present application claims priority under 35 U.S.C. § 119 to Japanese Patent Application No. 2018-183837 filed on Sep. 28, 2018. The content of the application is incorporated herein by reference in its entirety.

TECHNICAL FIELD

The present invention relates to a rotation speed detecting apparatus of an internal combustion engine.

BACKGROUND ART

Conventionally, as a rotation speed detecting apparatus of an internal combustion engine, an apparatus is known that includes a pulser ring that rotates integrally with a crankshaft on the back surface of a rotor for electric generation and detects a detected body composed of recess-projection teeth at the outer circumference of the pulser ring by a detector disposed outside the pulser ring in the radial direction (for example, refer to Patent Document 1).

PRIOR ART DOCUMENT

Patent Document

Patent Document 1
Japanese Patent Laid-open No. Hei 4-203226

SUMMARY OF THE INVENTION

Problems to be Solved by the Invention

Incidentally, to improve the detection accuracy of the rotation speed of the internal combustion engine, it is effective to increase the diameter of the above-described pulser ring and increase the number of teeth of the detected body. However, if this is done, it is conceivable that the space occupied by the pulser ring increases and the size of the rotation speed detecting apparatus becomes large.

The present invention is made in view of the above-described circumstances and intends to provide a rotation speed detecting apparatus of an internal combustion engine that has high detection accuracy of the rotation speed and is compact.

Means for Solving the Problems

A rotation speed detecting apparatus of an internal combustion engine has an internal combustion engine (11) having a crankcase (26) that supports a crankshaft (25), a rotor (47) supported by an end part of the crankshaft (25) in such a manner as to be incapable of rotation relative to the crankshaft (25), a pulser ring (51) that has a detected body (55) composed of recess-projection teeth and rotates integrally with the rotor (47), and a detector (52) that detects rotation speed of the crankshaft (25) by detecting the detected body (55). The rotation speed detecting apparatus is characterized by having the following configuration. The detected body (55) has a detected surface (60) opposed to the detector (52), and the detected surface (60) is inclined in such a manner as to be located closer to an outside of the crankshaft (25) in an axial direction of the crankshaft (25) as getting more apart from an axis line (25a) of the crankshaft (25) in a radial direction. In the detector (52), an axis line (52c) of the detector (52) is inclined with respect to the axis line (25a) of the crankshaft (25) in such a manner that the detector (52) is opposed to the detected surface (60).

Furthermore, in the above-described configuration, the crankcase (26) may include a wall part (41) that covers the rotor (47) from a periphery, and the detector (52) may penetrate the wall part (41) and be attached to the wall part (41).

In addition, in the above-described configuration, determination of misfire detection of the internal combustion engine (11) may be carried out on the basis of information detected by the detector (52).

Moreover, in the above-described configuration, the rotor (47) may have a chamfered part (47e) along the detected body (55) at a part opposed to the detected body (55).

Furthermore, in the above-described configuration, the detector (52) may be disposed inside in the axial direction of the crankshaft (25) relative to the pulser ring (51), and a detecting part (52b) of the detector (52) opposed to the detected surface (60) may be inclined in such a manner as to be located closer to the outside of the crankshaft (25) in the axial direction of the crankshaft (25) as getting more apart from the axis line (25a) of the crankshaft (25) in the radial direction.

Moreover, in the above-described configuration, the crankcase (26) may include a support wall (43a) that pivotally supports the crankshaft (25), and the detector (52) may be disposed between the detected body (55) and the support wall (43a). The detected surface (60) may be inclined in such a manner as to get further away from the support wall (43a) as getting more apart from the axis line (25a) of the crankshaft (25) in the radial direction.

Effects of the Invention

The rotation speed detecting apparatus of the internal combustion engine has the internal combustion engine having the crankcase that supports the crankshaft, the rotor supported by the end part of the crankshaft in such a manner as to be incapable of rotation relative to the crankshaft, the pulser ring that has the detected body composed of recess-projection teeth and rotates integrally with the rotor, and the detector that detects the rotation speed of the crankshaft by detecting the detected body. The detected body has the detected surface opposed to the detector, and the detected surface is inclined in such a manner as to be located closer to the outside of the crankshaft in the axial direction of the crankshaft as getting more apart from the axis line of the crankshaft in the radial direction. In the detector, the axis line of the detector is inclined with respect to the axis line of the crankshaft in such a manner that the detector is opposed to the detected surface.

According to this configuration, the detected surface of the pulser ring is inclined in such a manner as to be located closer to the outside of the crankshaft in the axial direction of the crankshaft as getting more apart from the axis line of the crankshaft in the radial direction. Therefore, even when the diameter of the pulser ring is increased and the detection accuracy is enhanced, the amount of protrusion of the detected body in the radial direction can be reduced. Furthermore, because the axis line of the detector is inclined with respect to the axis line of the crankshaft, the detector can be disposed compactly in the radial direction of the crankshaft. Moreover, the influence of vibration in the direction orthogonal to the crankshaft on the detection accuracy can be reduced compared with the case in which the axis line of the detector is orthogonal to the axis line of the crankshaft. For this reason, the rotation speed detecting apparatus that has high detection accuracy of the rotation speed and is compact can be provided.

Furthermore, in the above-described configuration, the crankcase may include the wall part that covers the rotor from the periphery, and the detector may penetrate the wall part and be attached to the wall part.

According to this configuration, the detector is disposed on the wall part that covers the rotor from the periphery and the position of the detector is far away from the crankshaft in the radial direction. Thus, it is possible to respond to increase in the diameter of the pulser ring and enhance the detection accuracy of the rotation speed. Moreover, because the detector is attached to the wall part of the crankcase with high rigidity, the influence of vibration on the detection accuracy can be reduced.

Furthermore, in the above-described configuration, determination of misfire detection of the internal combustion engine may be carried out on the basis of information detected by the detector.

According to this configuration, the determination of misfire detection can be properly carried out from the information with high detection accuracy.

Moreover, in the above-described configuration, the rotor may have the chamfered part along the detected body at the part opposed to the detected body.

According to this configuration, the detected body can be disposed in such a manner as to be brought closer to the rotor and thus the detected body can be compactly disposed.

In addition, in the above-described configuration, the detector may be disposed inside in the axial direction of the crankshaft relative to the pulser ring, and the detecting part of the detector opposed to the detected surface may be inclined in such a manner as to be located closer to the outside of the crankshaft in the axial direction of the crankshaft as getting more apart from the axis line of the crankshaft in the radial direction.

According to this configuration, when the rotor and the pulser ring are moved in the axial direction of the crankshaft and are removed, the detecting part of the detector hardly becomes an obstacle and the workability is high.

Furthermore, in the above-described configuration, the crankcase may include the support wall that pivotally supports the crankshaft, and the detector may be disposed between the detected body and the support wall. The detected surface may be inclined in such a manner as to get further away from the support wall as getting more apart from the axis line of the crankshaft in the radial direction.

According to this configuration, the detector can be compactly disposed between the detected body and the support wall.

MODES FOR CARRYING OUT THE INVENTION

An embodiment of the present invention will be described below with reference to the drawings. In the explanation, description of directions such as front, rear, left, right, upward, and downward directions represents directions with respect to the vehicle body unless otherwise noted. Furthermore, symbol FR depicted in the respective diagrams represents the vehicle body front side, and symbol UP indicates the vehicle body upper side, and symbol LH indicates the vehicle body left side.

Figure 1:
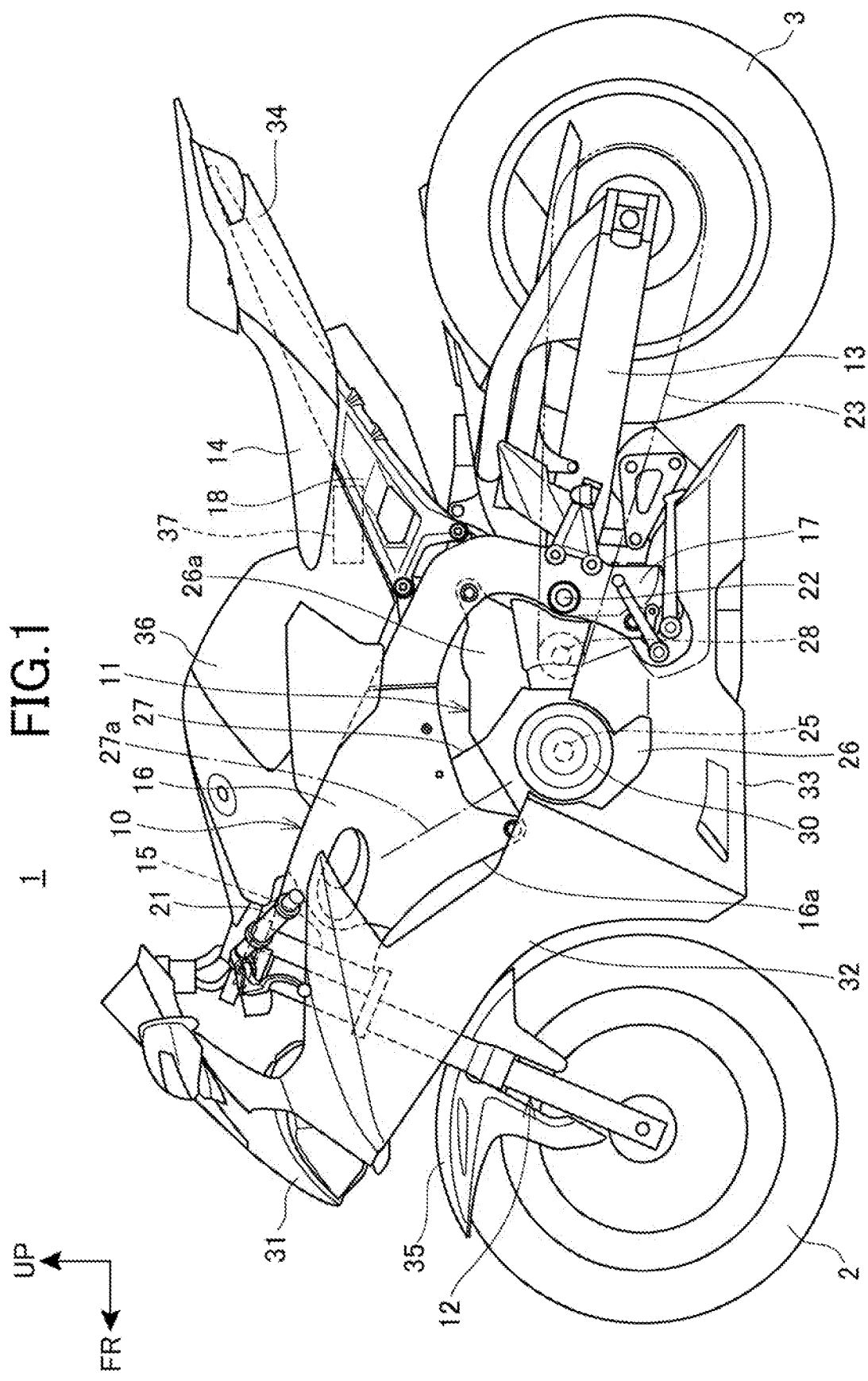
FIG. 1 is a left side view of a motorcycle on which an engine according to an embodiment of the present invention is mounted.

FIG. 1 is a left side view of a motorcycle 1 on which an engine 11 (internal combustion engine) according to the embodiment of the present invention is mounted.

The motorcycle 1 is a vehicle in which the engine 11 as a power unit is supported by a vehicle body frame 10, a front fork 12 that steerably supports a front wheel 2 is steerably supported by the front end of the vehicle body frame 10, and a swingarm 13 that supports a rear wheel 3 is disposed on the rear part side of the vehicle body frame 10.

The motorcycle 1 is a saddle riding vehicle on which a rider sits on a seat 14 in a straddling manner, and the seat 14 is disposed above the rear part of the vehicle body frame 10.

The vehicle body frame 10 includes a head pipe 15 disposed at the front end of the vehicle body frame 10, a pair of left and right main frames 16 that extend from the head pipe 15 toward the lower rear side, a pair of left and right pivot frames 17 that extend downward from the rear ends of the main frames 16, and a pair of left and right seat frames 18 that extend from the upper parts of the pivot frames 17 toward the upper rear side.

The main frames 16 include engine hanger parts 16a that extend downward from intermediate parts of the main frames 16 in the front-rear direction and support the engine 11.

The front fork 12 is pivotally supported by the head pipe 15 steerably in the left-right direction. A steering handlebar 21 is disposed at the upper part of the front fork 12. The front wheel 2 is pivotally supported by the lower end part of the front fork 12.

The swingarm 13 is pivotally supported by a pivot shaft 22 supported by the left and right pivot frames 17. The pivot shaft 22 horizontally extends in the vehicle width direction. The front end part of the swingarm 13 is pivotally supported by the pivot shaft 22 and the swingarm 13 swings in the upward-downward direction around the pivot shaft 22.

The motorcycle 1 includes, as a vehicle body cover, a front cover 31 that covers the upper part of the front fork 12 and the head pipe 15 from the front side, a front side cover 32 that covers the front part of the vehicle body frame 10 from lateral sides, an under-cover 33 that covers the engine 11 from the lower side, and a rear cover 34 that covers the rear part of the vehicle body.

A front fender 35 is attached to the front fork 12.

The motorcycle 1 includes a control unit 37 that controls the respective parts of the motorcycle 1, such as the engine 11. Here, the control unit 37 is an electronic control unit (ECU).

Figure 2:
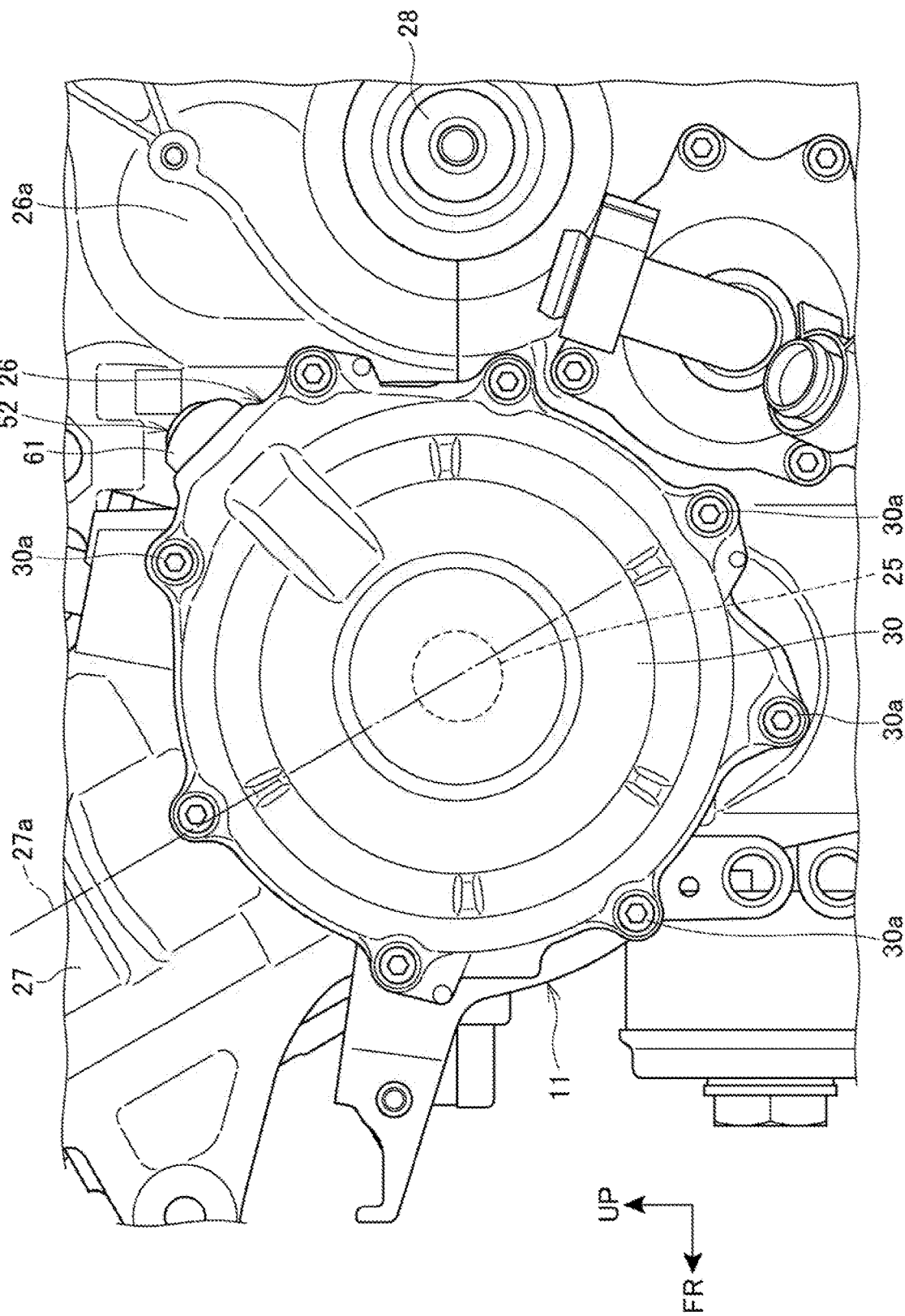
FIG. 2 is a left side view of the lower part of the engine.

FIG. 2 is a left side view of the lower part of the engine 11.

Referring to FIG. 1 and FIG. 2, the engine 11 is disposed below the main frames 16 and on the front side of the pivot frames 17 and is fixed to the vehicle body frame 10.

The engine 11 includes a crankcase 26 that supports a crankshaft 25 horizontally extending in the vehicle width direction (left-right direction) and a cylinder unit 27 that extends upward from the front part of the crankcase 26.

A piston 29 (FIG. 4) that carries out reciprocating motion in the cylinder unit 27 is housed in the cylinder unit 27. A combustion chamber, an ignition apparatus, and so forth are disposed in the cylinder unit 27. The piston 29 is connected to the crankshaft 25 through a connected rod (not depicted).

The engine 11 is a straight multiple cylinder internal combustion engine in which plural cylinders that house the pistons 29 are disposed on one row in the cylinder unit 27 along the axial direction of the crankshaft 25. The engine 11 is a four-cylinder engine, for example. A cylinder axis line 27a of the cylinder unit 27 tilts forward from the vertical direction.

The rear part of the crankcase 26 is a transmission case part 26a that houses a transmission (not depicted). The output of the engine 11 is transmitted to the rear wheel 3 through a drive chain 23 that connects an output shaft 28 of the above-described transmission and the rear wheel 3.

A side cover 30 is disposed on one lateral side (left side) of the left and right of the crankcase 26.

An intake apparatus (not depicted) of the engine 11 is connected to an intake port at the rear surface of the cylinder unit 27.

An exhaust apparatus (not depicted) of the engine 11 is connected to an exhaust port at the front surface of the cylinder unit 27.

Figure 3:
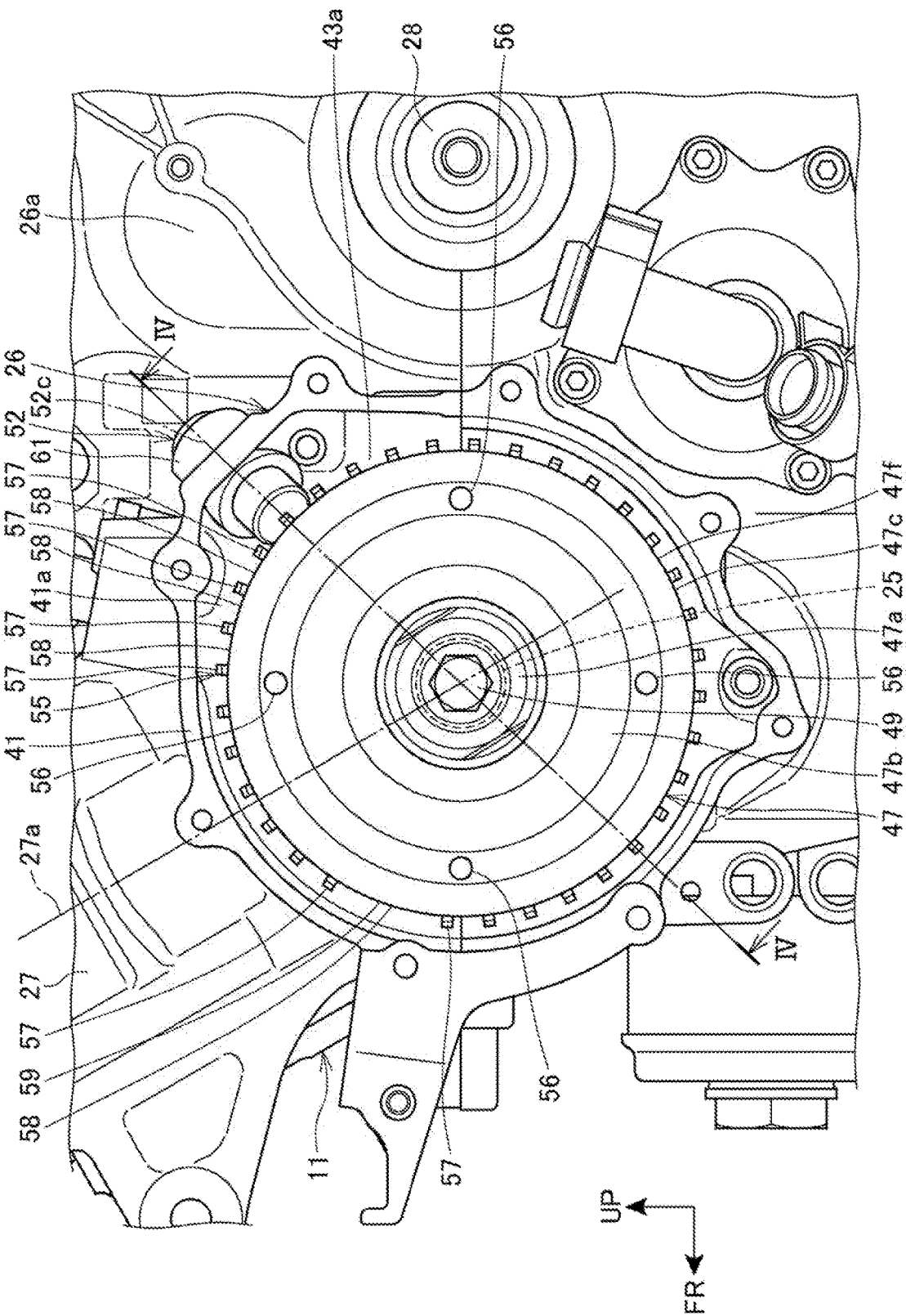
FIG. 3 is a left side view depicting the state in which a side cover is removed in FIG. 2.
Figure 4:
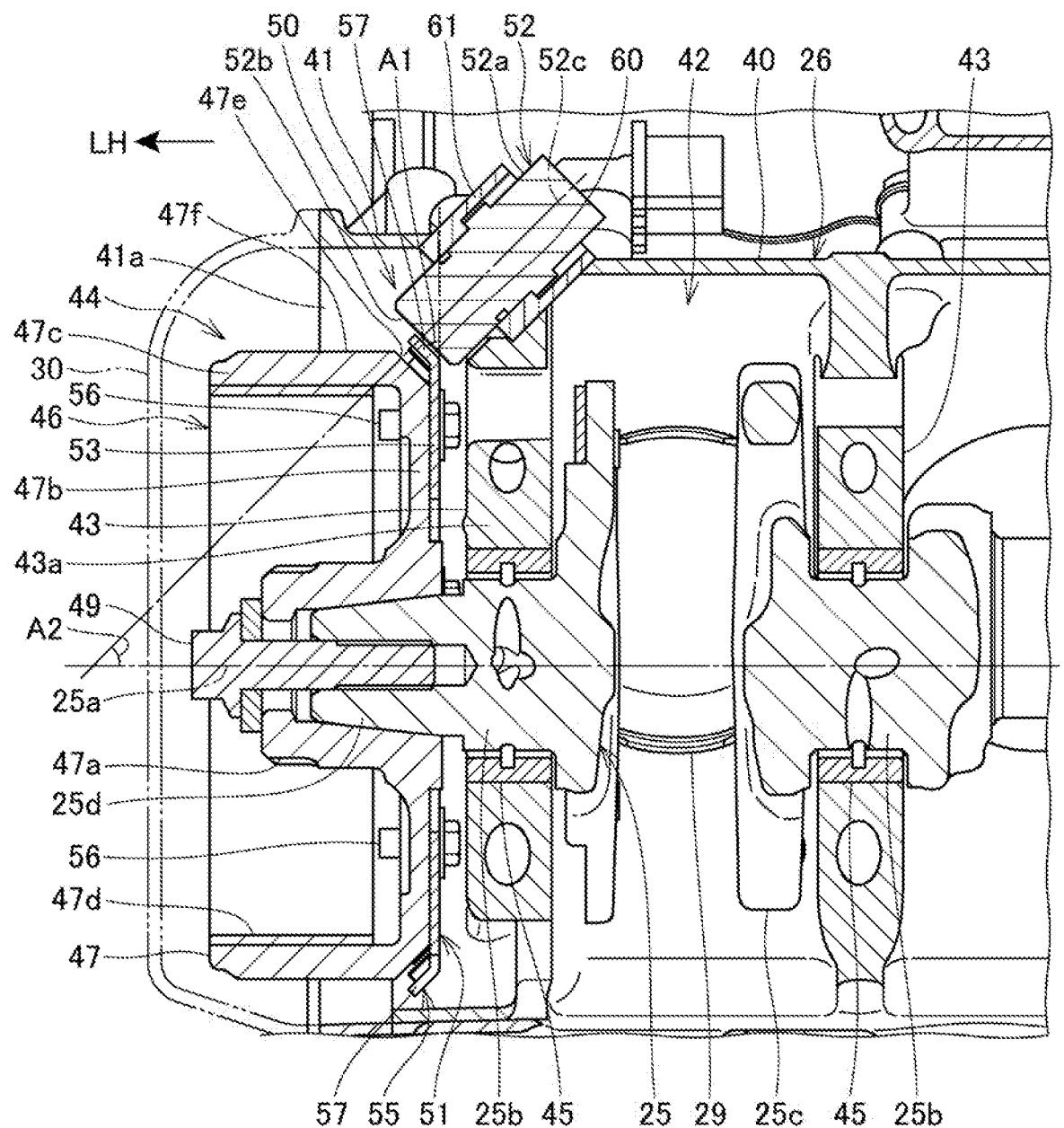
FIG. 4 is a sectional view along line IV-IV in FIG. 3.

FIG. 3 is a left side view depicting the state in which the side cover 30 is removed in FIG. 2. FIG. 4 is a sectional view along line IV-IV in FIG. 3. FIG. 4 is a sectional view obtained by cutting by a plane that substantially halves each of the crankshaft 25 and a detector 52 to be described later in the radial direction.

Referring to FIG. 3 and FIG. 4, the crankcase 26 includes a case main part 40 that supports the crankshaft 25 and a peripheral wall part 41 (wall part) that is disposed on an outer side surface of the case main part 40 and surrounds the crankshaft 25 from the periphery.

The case main part 40 includes a crank chamber 42 that houses the crankshaft 25 and support walls 43 that support the crankshaft 25. The support walls 43 are set in the orientation orthogonal to an axis line 25a of the crankshaft 25. In addition, the plural support walls 43 are disposed to be juxtaposed in the axial direction of the crankshaft 25. The crank chamber 42 is marked out in the vehicle width direction by the support walls 43 disposed at both end parts of the left and right in the case main part 40.

The peripheral wall part 41 protrudes from a support wall 43a located on one end side of the left and right in the case main part 40 in the plural support walls 43 in the axial direction of the axis line 25a of the crankshaft 25. The peripheral wall part 41 forms a side opening 41a marked out by the peripheral wall part 41 on the lateral side of the crankcase 26.

The side cover 30 is attached to the end surface of the peripheral wall part 41 and closes the side opening 41a. The side cover 30 is fastened to the peripheral wall part 41 by plural cover fixing bolts 30a (FIG. 2).

The crankcase 26 has a generator room 44 marked out by the support wall 43a, the peripheral wall part 41, and the side cover 30.

In the crankshaft 25, plural journal parts 25b are pivotally supported by the support walls 43 with the intermediary of bearings 45. A crank web 25c of the crankshaft 25 is disposed in the crank chamber 42.

One end part 25d of the crankshaft 25 penetrates the support wall 43a and protrudes to the outside of the crank chamber 42 to be located in the generator room 44.

In the generator room 44, an electric generator 46 that generates electricity by rotation of the crankshaft 25 is disposed.

The electric generator 46 includes a rotor 47 fixed to the one end part 25d of the crankshaft 25 and a stator (not depicted) disposed close to the rotor 47. The stator is an electromagnetic coil and is fixed to the inner surface of the side cover 30, for example.

The rotor 47 includes a fixed part 47a that is fitted to the outer circumferential part of the one end part 25d of the crankshaft 25 and has a cylindrical shape, a plate part 47b that extends from the fixed part 47a to the outside in the radial direction and has a circular disc shape, and a cylindrical part 47c that extends from the outer circumferential part of the plate part 47b to the outside in the axial direction of the crankshaft 25.

The rotor 47 is disposed coaxially with the crankshaft 25 and is fixed to the crankshaft 25 and rotates integrally with the crankshaft 25. The rotor 47 is a fly wheel of the engine 11 as well as a component for electric generation.

The inner circumferential part of the fixed part 47a of the rotor 47 is formed into a taper shape tapered toward the shaft end side of the crankshaft 25 in conformity to the outer circumferential part of the one end part 25d of the crankshaft 25.

The fixed part 47a is fixed to the one end part 25d by a rotor fixing bolt 49 fastened to the end surface of the one end part 25d of the crankshaft 25.

The rotor fixing bolt 49 presses the fixed part 47a in the axial direction of the crankshaft 25 and brings the taper-shaped inner circumferential part of the fixed part 47a into tight contact with the outer circumferential part of the one end part 25d of the crankshaft 25.

The plate part 47b of the rotor 47 is set substantially parallel to the support wall 43a of the case main part 40 and is disposed apart from the support wall 43a outward in the axial direction of the crankshaft 25.

The cylindrical part 47c of the rotor 47 is a component that is set to surround the one end part 25d of the crankshaft 25 from the periphery and has a circular cylindrical shape. The cylindrical part 47c is disposed coaxially with the crankshaft 25. A magnet 47d is disposed on the inner circumferential surface of the cylindrical part 47c. When the rotor 47 rotates, the magnet 47d rotates around the above-described stator.

At the end part on the side of the support wall 43a at the outer circumferential part of the cylindrical part 47c, a chamfered part 47e obtained by cutting the corner part of the cylindrical part 47c across the whole circumference is made. The chamfered part 47e is inclined in such a manner that the diameter of the cylindrical part 47c becomes smaller toward the support wall 43a in the axial direction of the crankshaft 25.

In the engine 11, a rotation speed detecting apparatus 50 that detects the rotation speed of the crankshaft 25 is set.

The rotation speed detecting apparatus 50 includes a pulser ring 51 that is fixed to the rotor 47 and rotates integrally with the rotor 47 and the crankshaft 25 and the detector 52 that detects rotation of the pulser ring 51.

The pulser ring 51 is disposed coaxially with the crankshaft 25.

The pulser ring 51 is fixed to the side surface on the inside in the vehicle width direction in the side surfaces of the plate part 47b of the rotor 47. That is, the pulser ring 51 is disposed between the rotor 47 and the support wall 43a and is located in the generator room 44.

The pulser ring 51 includes a ring main part 53 with a circular disc shape along the plate part 47b of the rotor 47 and a detected body 55 disposed at the outer circumferential part of the ring main part 53.

The ring main part 53 is a plate member orthogonal to the axis line 25a of the crankshaft 25.

The pulser ring 51 is fixed to the rotor 47 by plural ring fixing bolts 56. The ring fixing bolts 56 are inserted into the ring main part 53 from the side of the support wall 43a and are fastened to the plate part 47b.

The detected body 55 is composed of recess-projection teeth. Specifically, the recess-projection teeth include plural tooth parts 57 that protrude from the outer circumference of the ring main part 53 to the outside in the radial direction and recess parts 58 formed between adjacent tooth parts 57. The tooth parts 57 and the recess parts 58 are disposed alternately in the circumferential direction of the pulser ring 51.

The plural tooth parts 57 are disposed at equal intervals in the circumferential direction of the pulser ring 51. The tooth parts 57 are disposed in a radial manner around the axis line 25a.

The recess parts 58 are parts that hollow inward in the radial direction relative to the tooth parts 57 between the tooth parts 57 and the plural recess parts 58 are disposed at equal intervals in the circumferential direction of the pulser ring 51.

The detected body 55 has, at one place, an unequal interval part 59 that makes the interval between adjacent tooth parts 57 be an unequal interval through cutting part of the tooth parts 57 disposed at the equal intervals. At the unequal interval part 59, the recess part 58 is longer than the other recess parts 58 in the circumferential direction.

Figure 5:
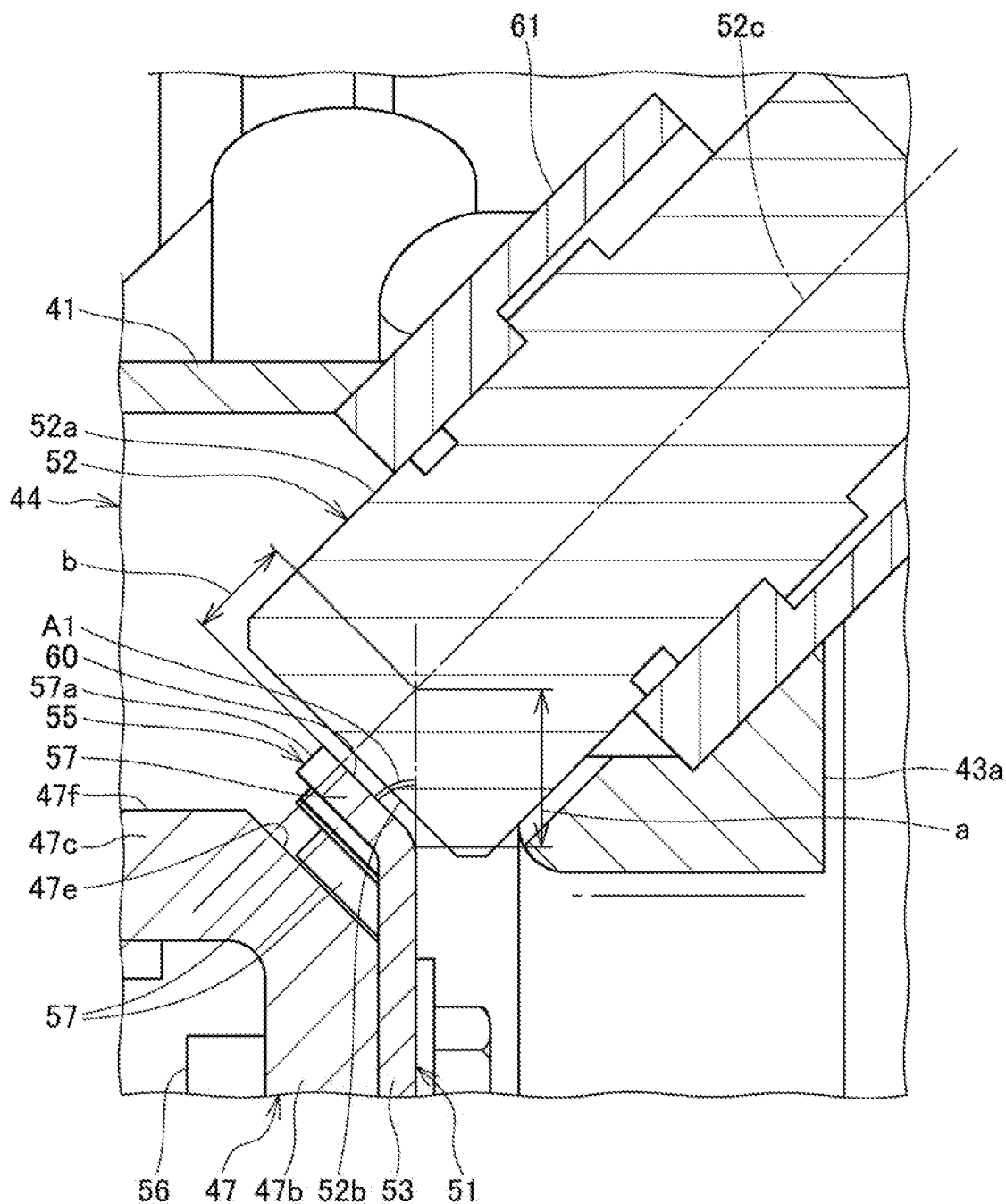
FIG. 5 is a sectional view obtained by enlarging a part of a detected body and a detector in FIG. 4.

FIG. 5 is a sectional view obtained by enlarging the part of the detected body 55 and the detector 52 in FIG. 4.

Referring to FIG. 4 and FIG. 5, the tooth part 57 bends outward in the axial direction of the crankshaft 25 with respect to the ring main part 53 orthogonal to the axis line 25a of the crankshaft 25 and is inclined with respect to the ring main part 53.

Specifically, the tooth part 57 is inclined in such a manner as to be located closer to the outside of the crankshaft 25 in the axial direction of the crankshaft 25 (outside in the vehicle width direction) as getting more apart from the axis line 25a of the crankshaft 25 toward the outside in the radial direction of the crankshaft 25. Furthermore, it can be said that the tooth part 57 bends toward the side cover 30 in the axial direction of the crankshaft 25.

The inclination angle of the tooth part 57 with respect to the ring main part 53 orthogonal to the axis line 25a of the crankshaft 25 is an angle A1. Here, the angle A1 is 45°, for example.

The inside surface in the tooth part 57 in the vehicle width direction is a detected surface 60 opposed to the detector 52. The inclination angle of the detected surface 60 is the angle A1 as with the tooth part 57.

The tooth part 57 protrudes outward in the radial direction relative to an outer circumferential surface 47f of the cylindrical part 47c of the rotor 47. Because the tooth part 57 bends outward in the vehicle width direction, a tip 57a of the tooth part 57 is located outside in the vehicle width direction relative to the ring main part 53.

The tooth part 57 is set to cover the chamfered part 47e of the cylindrical part 47c from the outer circumferential side and is inclined substantially parallel to the chamfered part 47e along the inclination of the chamfered part 47e.

Thus, the tooth part 57 can be disposed close to the cylindrical part 47c in the radial direction.

The pulser ring 51 is manufactured through press working of a metal plate, for example. Specifically, the outer shape of the pulser ring 51 including the detected body 55 is formed through punching of a metal plate by a die. Thereafter, an inclination at the angle A1 is given to the detected body 55 by bending with a die.

The detector 52 is a sensor that detects the tooth part 57 in a contactless manner and includes a detector case 52a with a circular column shape and a detecting part 52b set on the tip surface of the detector case 52a.

The detector 52 is a pick-up coil, for example. The detector 52 detects change in magnetic flux based on the recesses and projections of the recess parts 58 and the tooth parts 57 by the detecting part 52b and detects the change in magnetic flux as the rotation of the pulser ring 51. The pulser ring 51 rotates integrally with the crankshaft 25 at the same speed and therefore the rotation speed of the pulser ring 51 is equal to the rotation speed of the crankshaft 25. That is, the detector 52 detects the rotation of the crankshaft 25.

The control unit 37 (FIG. 1) calculates the rotation speed of the crankshaft 25 from information on the rotation of the pulser ring 51 detected by the detector 52. Furthermore, the control unit 37 can detect the phase of the rotation of the crankshaft 25 by detecting the unequal interval part 59.

The detector 52 is disposed to penetrate the peripheral wall part 41 of the crankcase 26 from the upper side and the detecting part 52b is disposed in the generator room 44. The detector 52 is attached to the peripheral wall part 41 and is supported by the case main part 40.

Specifically, a support tube 61 that penetrates the peripheral wall part 41 to the generator room 44 is disposed at the rear part of the upper part of the peripheral wall part 41, and the detector 52 is attached to the support tube 61. The detector 52 is fixed to the support tube 61 through fitting of the outer circumferential part of the detector case 52a to the inner circumferential part of the support tube 61. The detector 52 may be fixed through screwing of a screw part disposed at the outer circumferential part of the detector case 52a to the inner circumferential part of the support tube 61, for example.

As depicted in FIG. 3, as viewed in the axial direction of the crankshaft 25 (in vehicle side view), the detector 52 is disposed between the crankshaft 25 and the output shaft 28 and on the upper side relative to the crankshaft 25 and the output shaft 28.

Furthermore, as viewed in the axial direction of the crankshaft 25, the detector 52 is disposed above the rear part of the upper part of the pulser ring 51 and is disposed to be inclined, with the front side lowered, so that a detector axis line 52c of the detector 52 may pass through the axis line 25a of the crankshaft 25 (center of the crankshaft 25). The detector axis line 52c is an axis line that passes through the center of the detector case 52a and extends in the axial direction of the detector case 52a.

As depicted in FIG. 4 and FIG. 5, in the detector 52, the detector axis line 52c is disposed to be inclined with respect to the axis line 25a of the crankshaft 25 in such a manner that the detecting part 52b at the tip is opposed to the detected surface 60 of the tooth part 57 of the pulser ring 51.

The detecting part 52b is disposed to be apart from the detected surface 60 of the pulser ring 51 toward the outside in the radial direction of the pulser ring 51 and is disposed in substantially parallel to the detected surface 60. The detector axis line 52c is substantially orthogonal to the detected surface 60.

The inclination angle of the detector axis line 52c with respect to the axis line 25a of the crankshaft 25 is an angle A2. The angle A2 is smaller than the right angle.

Here, the detector axis line 52c is orthogonal to the detected surface 60 of the tooth part 57. Thus, because of the geometric relationship, the angle A2, which is the inclination angle of the detector axis line 52c and the angle A1, which is the inclination angle of the tooth part 57, are equal. The angle A2 is 45°, for example.

In the pulser ring 51, the tooth part 57 is inclined in such a manner as to be located closer to the outside of the crankshaft 25 in the axial direction of the crankshaft 25 as getting more apart from the axis line 25a of the crankshaft 25 toward the outside in the radial direction of the crankshaft 25. Therefore, even when the outer diameter of the recess-projection teeth of the detected body 55 is set large, the pulser ring 51 can be formed compactly in the radial direction. By setting the outer diameter of the recess-projection teeth of the detected body 55 larger, the interval between the adjacent tooth parts 57 can be made longer, and the number of tooth parts 57 can be increased. Thus, the tooth parts 57 can be favorably detected by the detector 52, and the rotation speed of the crankshaft 25 can be detected with high accuracy. By setting the angle A1 of the tooth parts 57 to 45°, compactization of the outer diameter of the pulser ring 51 and improvement in the detection accuracy can both be achieved.

In the detector 52, the detector axis line 52c is disposed to be inclined with respect to the axis line 25a of the crankshaft 25 in such a manner that the detecting part 52b is opposed to the detected surface 60 of the tooth part 57 of the pulser ring 51. Thus, the tooth parts 57 can be favorably detected even with the configuration in which the tooth parts 57 are inclined.

Furthermore, the detector 52 is disposed to be inclined with respect to the axis line 25a of the crankshaft 25 at an angle smaller than the right angle. Thus, the detector 52 can be disposed compactly in the radial direction of the crankshaft 25.

The detector 52 is located between the support wall 43a and the pulser ring 51 in the axial direction of the crankshaft 25.

The detecting part 52b of the detector 52 is substantially parallel to the detected surface 60 of the pulser ring 51 and is inclined in such a manner as to be located closer to the outside of the crankshaft 25 in the axial direction of the crankshaft 25 as getting more apart from the axis line 25a of the crankshaft 25 toward the outside of the crankshaft 25 in the radial direction of the crankshaft 25. The detecting part 52b of the detector 52 is located inside in the axial direction of the crankshaft 25 relative to the detected surface 60 of the pulser ring 51. Due to this, the detecting part 52b hardly becomes an obstacle when the fastening of the rotor fixing bolt 49 is released and the rotor 47 and the pulser ring 51 are removed to the outside in the axial direction of the crankshaft 25. For this reason, workability of attaching and detaching of the rotor 47 and the pulser ring 51 is high.

The detected surface 60 of the pulser ring 51 is inclined in such a manner as to get further away from the support wall 43a as getting more apart from the axis line 25a of the crankshaft 25 toward the outside in the radial direction of the crankshaft 25, and the lower end part of the detector 52 is disposed between the detected surface 60 and the support wall 43a. For this reason, the detector 52 can be compactly disposed in a space ensured due to the inclination of the detected surface 60.

Referring to FIG. 5, when the ring main part 53 of the pulser ring 51 is displaced in the radial direction of the crankshaft 25 by distance a, the distance of displacement of the detected surface 60 in association with this is distance b.

The relationship between the distance a and the distance b is represented by the following expression (1).

$$b = a \cdot \sin(A1) \tag{1}$$

That is, the distance b is shorter than the distance a. Due to this, when vibration in the direction orthogonal to the crankshaft 25 acts on the pulser ring 51 in association with rotation of the crankshaft 25, the displacement of the detected surface 60 due to the vibration can be made small. This can properly keep the clearance between the detected surface 60 and the detecting part 52b.

The control unit 37 (FIG. 1) carries out determination of misfire detection of the engine 11 on the basis of the rotation speed of the crankshaft 25 detected by the detector 52.

Specifically, the control unit 37 determines that the engine 11 has misfired by detecting variation in the angular velocity of rotation of the crankshaft 25 detected by the detector 52.

As described above, according to the embodiment to which the present invention is applied, the rotation speed detecting apparatus 50 of the engine 11 has the engine 11 having the crankcase 26 that supports the crankshaft 25, the rotor 47 supported by an end part of the crankshaft 25 in such a manner as to be incapable of rotation relative to the crankshaft 25, the pulser ring 51 that has the detected body 55 composed of recess-projection teeth and rotates integrally with the rotor 47, and the detector 52 that detects the rotation speed of the crankshaft 25 by detecting the detected body 55. The detected body 55 has the detected surface 60 opposed to the detector 52, and the detected surface 60 is inclined in such a manner as to be located closer to the outside of the crankshaft 25 in the axial direction of the crankshaft 25 as getting more apart from the axis line 25a of the crankshaft 25 in the radial direction. In the detector 52, the detector axis line 52c of the detector 52 is inclined with respect to the axis line 25a of the crankshaft 25 in such a manner that the detector 52 is opposed to the detected surface 60.

According to this configuration, the detected surface 60 of the pulser ring 51 is inclined in such a manner as to be located closer to the outside of the crankshaft 25 in the axial direction of the crankshaft 25 as getting more apart from the axis line 25a of the crankshaft 25 in the radial direction. Therefore, even when the diameter of the pulser ring 51 is increased and the detection accuracy is enhanced, the amount of protrusion of the detected body 55 in the radial direction can be reduced. Furthermore, because the detector axis line 52c is inclined with respect to the axis line 25a of the crankshaft 25, the detector 52 can be disposed compactly in the radial direction of the crankshaft 25. Moreover, the influence of vibration in the direction orthogonal to the crankshaft 25 on the detection accuracy can be reduced compared with the case in which the detector axis line 52c is orthogonal to the axis line 25a of the crankshaft 25. For this reason, the rotation speed detecting apparatus 50 that has high detection accuracy of the rotation speed of the crankshaft 25 and is compact can be provided.

Furthermore, the crankcase 26 includes the peripheral wall part 41 that covers the rotor 47 from the periphery, and the detector 52 penetrates the peripheral wall part 41 and is attached to the peripheral wall part 41. According to this configuration, the detector 52 is disposed on the peripheral wall part 41 that covers the rotor 47 from the periphery, and the position of the detector 52 is far away from the crankshaft 25 in the radial direction. Thus, it is possible to respond to increase in the diameter of the pulser ring 51 and enhance the detection accuracy of the rotation speed. Moreover, because the detector 52 is attached to the peripheral wall part 41 of the crankcase 26 with high rigidity, the influence of vibration on the detection accuracy can be reduced compared with a configuration in which the detector 52 is attached to the side cover 30, for example. In addition, because the detector 52 is attached to the peripheral wall part 41 disposed monolithically with the case main part 40 of the crankcase 26, the detector 52 can be accurately positioned with respect to the detected surface 60 compared with the configuration in which the detector 52 is attached to the side cover 30, for example.

Furthermore, determination of misfire detection of the engine 11 is carried out on the basis of information detected by the detector 52. According to this configuration, the determination of misfire detection can be properly carried out from the information with high detection accuracy.

Moreover, the rotor 47 has the chamfered part 47e along the detected body 55 at the part opposed to the detected body 55. According to this configuration, the detected body 55 can be disposed in such a manner as to be brought closer to the rotor 47, and thus the detected body 55 can be compactly disposed.

In addition, the detector 52 is disposed inside in the axial direction of the crankshaft 25 relative to the pulser ring 51, and the detecting part 52b of the detector 52 opposed to the detected surface 60 is inclined in such a manner as to be located closer to the outside of the crankshaft 25 in the axial direction of the crankshaft 25 as getting more apart from the axis line 25a of the crankshaft 25 in the radial direction.

According to this configuration, when the rotor 47 and the pulser ring 51 are moved in the axial direction of the crankshaft 25 and are removed, the detecting part 52b of the detector 52 hardly becomes an obstacle and the workability is high.

Furthermore, the crankcase 26 includes the support wall 43a that pivotally supports the crankshaft 25, and the detector 52 is disposed between the detected body 55 and the support wall 43a. The detected surface 60 is inclined in such a manner as to get further away from the support wall 43a as getting more apart from the axis line 25a of the crankshaft 25 in the radial direction.

According to this configuration, the detector 52 can be compactly disposed between the detected body 55 and the support wall 43a.

The above-described embodiment illustrates one aspect to which the present invention is applied, and the present invention is not limited to the above-described embodiment.

In the above-described embodiment, description is made by taking the motorcycle 1 as an example of the saddle riding vehicle on which the engine 11 is mounted. However, the present invention is not limited thereto. The present invention can be applied to three-wheeled saddle riding vehicles including two front wheels or rear wheels, saddle riding vehicles including four or more wheels, and other vehicles.

DESCRIPTION OF REFERENCE SYMBOLS

11 Engine (internal combustion engine)
25 Crankshaft
25a Axis line
26 Crankcase
41 Peripheral wall part (wall part)
43a Support wall
47 Rotor
47e Chamfered part
50 Rotation speed detecting apparatus
51 Pulser ring
52 Detector
52b Detecting part
52c Detector axis line (axis line of detector)
55 Detected body
60 Detected surface

The invention claimed is:

1. A rotation speed detecting apparatus of an internal combustion engine, the rotation speed detecting apparatus having: an internal combustion engine having a crankcase that supports a crankshaft; a rotor supported by an end part of the crankshaft in such a manner as to be incapable of rotation relative to the crankshaft; a pulser ring that has a detected body composed of recess-projection teeth and rotates integrally with the rotor; and a detector that detects rotation speed of the crankshaft by detecting the detected body, wherein
the detected body has a detected surface opposed to the detector, and the detected surface is inclined in such a manner as to be located closer to an outside of the crankshaft in an axial direction of the crankshaft as getting more apart from an axis line of the crankshaft in a radial direction,
in the detector, an axis line of the detector is inclined with respect to the axis line of the crankshaft in such a manner that the detector is opposed to the detected surface, and
the rotor has a chamfered part along the detected body at a part opposed to the detected body.

2. The rotation speed detecting apparatus of the internal combustion engine according to claim 1, wherein
the crankcase includes a wall part that covers the rotor from a periphery, and
the detector penetrates the wall part and is attached to the wall part.

3. The rotation speed detecting apparatus of the internal combustion engine according to claim 1, wherein
determination of misfire detection of the internal combustion engine is carried out on the basis of information detected by the detector.

4. The rotation speed detecting apparatus of the internal combustion engine according to claim 1, wherein
the detector is disposed inside in the axial direction of the crankshaft relative to the pulser ring, and
a detecting part of the detector opposed to the detected surface is inclined in such a manner as to be located closer to the outside of the crankshaft in the axial direction of the crankshaft as getting more apart from the axis line of the crankshaft in the radial direction.

5. The rotation speed detecting apparatus of the internal combustion engine according to claim 1, wherein
the crankcase includes a support wall that pivotally supports the crankshaft,
the detector is disposed between the detected body and the support wall, and
the detected surface is inclined in such a manner as to get further away from the support wall as getting more apart from the axis line of the crankshaft in the radial direction.

* * * * *